United States Patent [19]

Cunningham

[11] Patent Number: 4,558,528
[45] Date of Patent: Dec. 17, 1985

[54] OPENABLE PACKAGE FOR A CONSUMER PRODUCT SUCH AS CHILD'S MEAL, WITH A BUILT-IN 3-D VIEWER FEATURE SIMULATING A THEATER

[75] Inventor: William D. Cunningham, Rocky Mount, N.C.

[73] Assignee: Hardee's Food Systems, Inc., Rocky Mount, N.C.

[21] Appl. No.: 475,374

[22] Filed: Mar. 14, 1983

[51] Int. Cl.⁴ .............................................. G02B 27/04
[52] U.S. Cl. ....................................... 40/365; 350/140
[58] Field of Search .................... 350/140, 132; 46/11, 46/13; 206/116, 232; 40/365

[56] References Cited

U.S. PATENT DOCUMENTS

| 1,682,594 | 8/1928 | Benjamin | 46/11 |
| 1,995,463 | 3/1935 | Young | 46/11 |
| 2,025,352 | 12/1935 | Lemon | 206/232 |
| 2,283,777 | 5/1942 | Wendling | 350/140 |
| 2,748,527 | 6/1956 | Seals | 46/11 |
| 2,757,573 | 8/1956 | Turner | 350/140 |
| 4,357,073 | 11/1982 | Carver | 350/140 |
| 4,365,432 | 12/1982 | McCauley et al. | 40/365 |

FOREIGN PATENT DOCUMENTS 599785 7/1934 Fed. Rep. of Germany ........ 40/365
11139 of 1908 United Kingdom ................ 40/365

Primary Examiner—Robert P. Swiatek
Assistant Examiner—Cary E. Stone
Attorney, Agent, or Firm—Cushman, Darby & Cushman

[57] ABSTRACT

A consumer package which may be opened-up for removal of a contained product such as a child's meal, is provided with a built-in 3-D viewer feature preferably simulating a theater such as a motion picture theater or television viewing room. To that end, side-by-side viewing ports of two different optical characteristics are provided in one wall of the package for viewing a scene or series of scenes, which may be disposed internally of an opposite wall of the package. Each scene is printed in two, stereoptic views which are of the same optical characteristics as respective ones of the two viewing ports. These views are generally superimposed, but are slightly laterally out of registry by an amount sufficient to produce a simulation of three-dimensional imagery to a viewer who places the package to his or her face and views therein with both eyes, each looking through the respective viewing port at the respective view of the scene. The scene or scenes may be printed directly on the interior of the package, or on an insert which may be placed in or moved through the package interior. A skylight-type port may be provided for increasing illumination of the scene.

8 Claims, 6 Drawing Figures

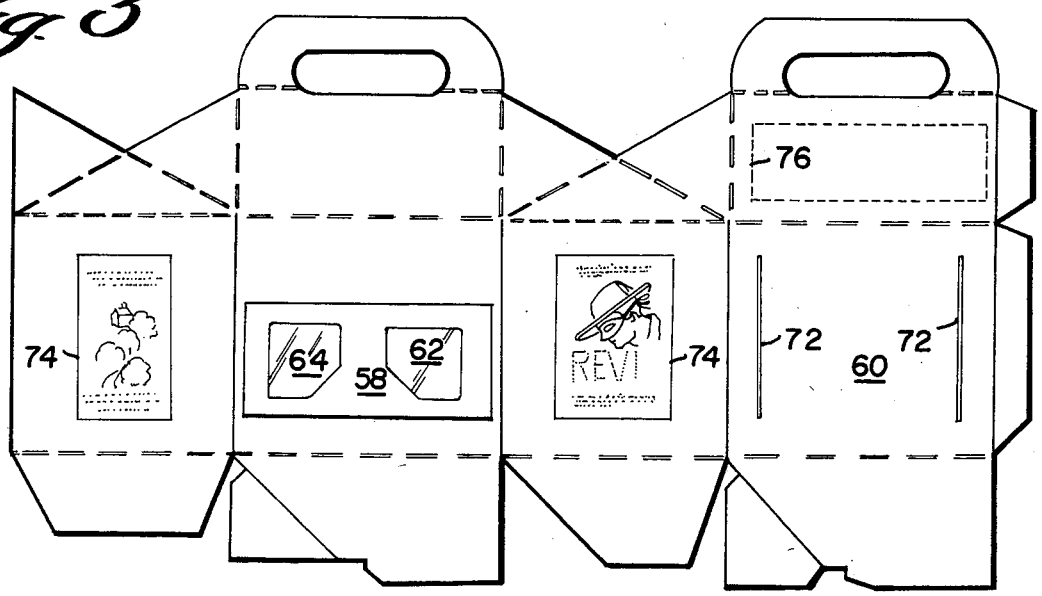
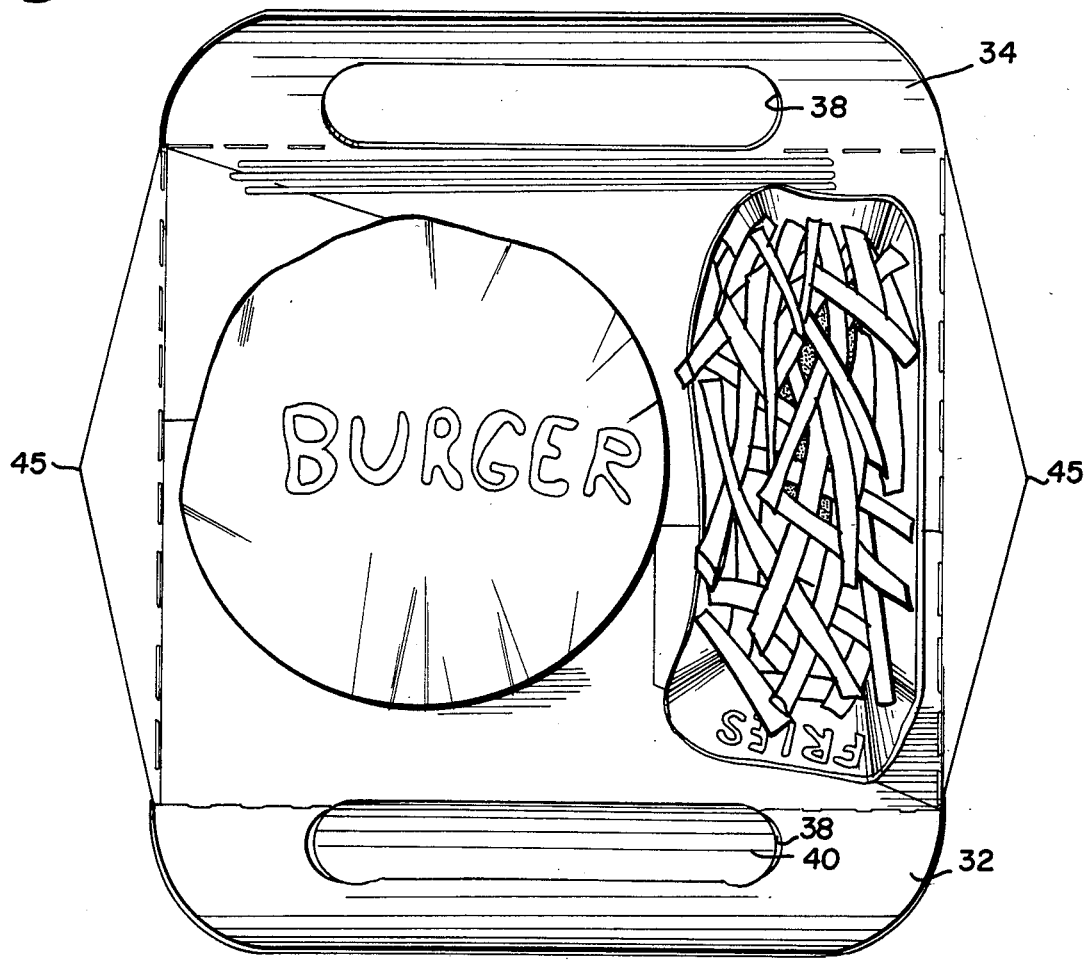

OPENABLE PACKAGE FOR A CONSUMER PRODUCT SUCH AS CHILD'S MEAL, WITH A BUILT-IN 3-D VIEWER FEATURE SIMULATING A THEATER

BACKGROUND OF THE INVENTION

In the United States at present, one cultural activity which has become a Saturday morning staple, is television cartoon shows for small children. Much of this programming is aired on commercial television, which provides an opportunity for marketers to target the audience with advertising relating to products and services for which small children are a major force in evoking consumption. Accordingly, it is known that an opportunity for reinforcement exists where a commercial message on a television cartoon program relates to a product which embodies or is illustrated with or sold with the aid of cartoon characters from the program, and the product when purchased bears reminders that the cartoon program is regularly available for viewing on television. The present invention makes it possible to take this reinforcement to a higher level, by making the packing in which the cartoon program television-advertised product is vended into a simulated theater, television viewing room or the like as to which the consumer, after having acquired the package and consumed or removed its contants, may manipulate the cartoon characters, and view them in a three-dimensional way, neither such enhancement currently being generally available in respect to the Saturday morning television cartoon programs.

Quick service/limited menu take-out food stores sometimes receive criticism, when consumers in their eagerness to get at the food discard the packaging without placing it in the convenient, store-provided receptacles. Some such consumers may consider the packaging once separated from the consumable product to be a useless impediment, the sooner discarded the better. However, by creating a useful, separately interesting product out of the packaging material, the store can create a desire for the packaging which may be as strong or stronger than the desire for the usual contained product. Such packaging material is much less likely to be thoughtlessly discarded.

SUMMARY OF THE INVENTION

A consumer package which may be opened-up for removal of a contained product such as a child's meal, is provided with a built-in 3-D viewer feature preferably simulating a theater such as a motion picture theater or television viewing room. To that end, side-by-side viewing ports of two different optical characteristics are provided in one wall of the package for viewing a scene or series of scenes, which may be disposed internally on an opposite wall of the package. Each scene is printed in two, stereoptic views which are of the same optical characteristics as respective ones of the two viewing ports. These views are generally superimposed, but are slightly laterally out of registry by an amount sufficient to produce a simulation of three-dimensional imagery to a viewer who places the package to his or her face and views thereinto with both eyes, each looking through the respective viewing port at the respective view of the scene. The scene or scenes may be printed directly on the interior of the package, or on an insert which may be placed in or moved through the package interior. A skylight-type port may be provided for increasing illumination of the scene.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 3 is a similar rear elevation view thereof.

FIG. 4 is a top plan view of the package in an erected, open condition, containing both a consumer product such as a child's meal comprising a hamburger sandwich and french fries, and a series of stereoptic comic strip views on a pull-through card.

DETAILED DESCRIPTION

Figure 1:
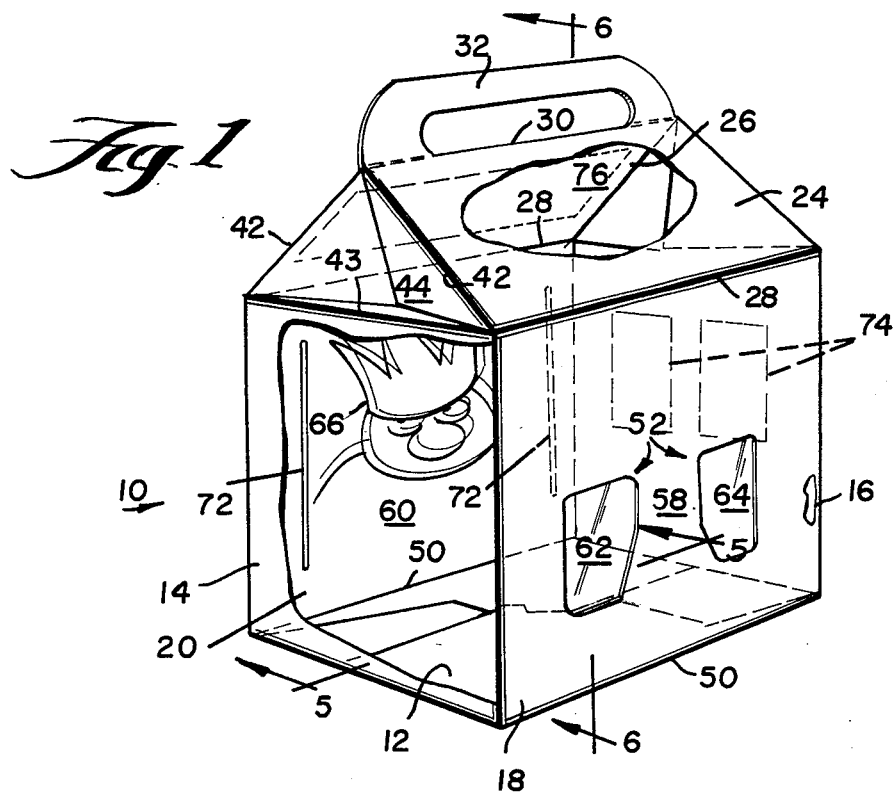
FIG. 1 is a perspective view of an openable package for a consumer product such as a child's meal, the package being shown provided with a 3-D viewer feature simulating a theater or the like in accordance with principles of the present invention, parts being broken away to expose internal details.

The principles of the invention are illustrated herein in the context of a child's meal box which may be folded up from a flat condition, filled with food, closed-up and presented to a child. The child may then take out and eat the food, and use the box as a 3-D viewer for one or more stereoptic scenes, e.g. of T.V. cartoon characters either printed on the inside of the box, or on a separate strip. However, the package need not be a box (e.g. it may be a bag such as a lunch bag); it need not originally contain food (e.g. it may contain an article of clothing); it need not be targeted for children (e.g. it may be aimed at an adult market, or at a student market or the like), and the 3-D scene or scenes need not be of cartoon-type (e.g. each or some scenes may be photographic, or of paintings, drawings or the like, whether realistic, impressionistic, abstract, super-realistic or the like, and may contain text as well as or in place of graphics). The folding box shown in the drawings, minus all of the 3-D viewer features, is based on a pre-existing box used by Hardee's Food Systems, Inc. and its franchisees restaurants in connection with a 1982 promotion entitled the Shirt-Tales program.

In FIG. 1 there is shown a consumer package 10, e.g. made of paperboard or the like, and having a generally flat floor 12, two opposed generally upright end walls 14, 16, two opposed generally upright sidewalls, e.g. a front wall 18 and a rear wall 20, and an openable top or cover 22, typically including two roof panels 24, 26 which rise obliquely, respectively from the upper marginal edges 28 of the front and rear walls to a center ridge 30 which extends laterally. Along the ridge 30, each roof panel 24, 26 is provided with a respective handle panel 32, 34 one of these being completely slotted at the center as at 36 and the other being partially slotted as at 38, leaving a tab 40 which folds through the other slot to removably retain the top 22 in a closed condition and to provide a convenient carrying handle. Between the lateral margins 42 of the roof panels and the upper lateral margins 43 of the end walls 14, 16, the package 10 is shown provided with gable structures 44 which fold over (compare FIG. 4) and tuck at the tips 45 thereof into slots 46 provided in the end walls in order to make a neat package and in some cases help to keep hot food hot, or the like.

Figure 2:
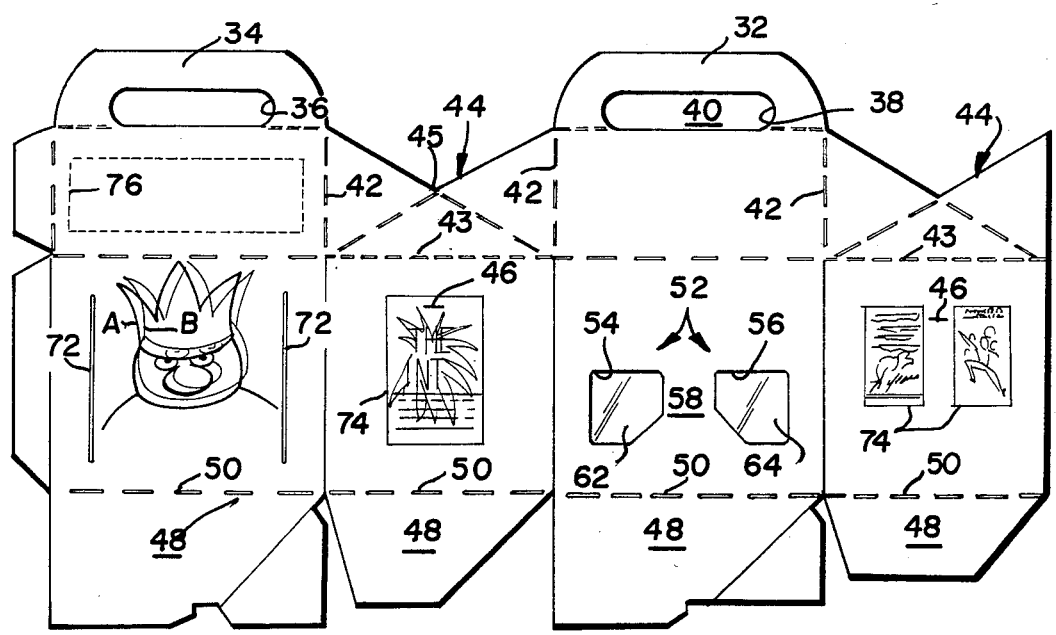
FIG. 2 is a front elevational view of the package in a flat condition.
Figure 5:
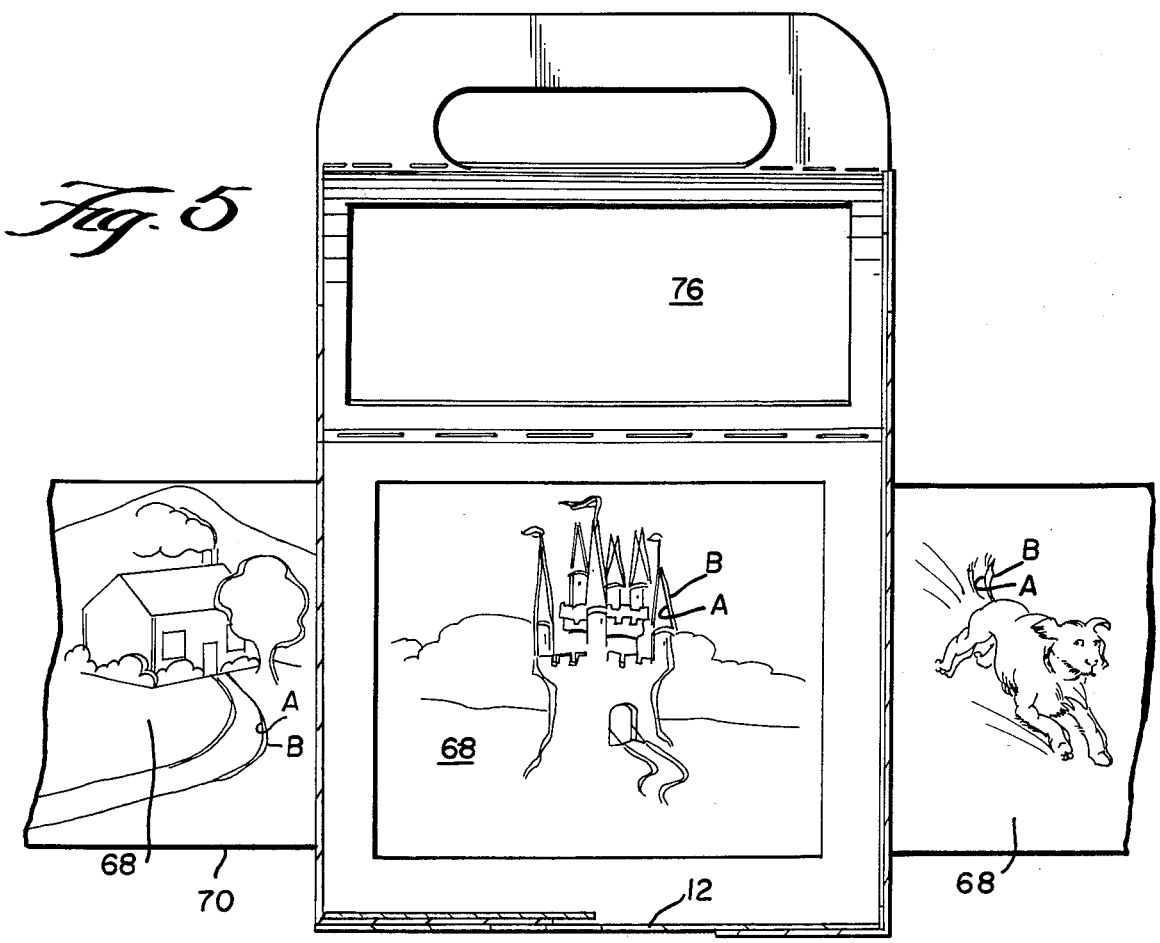
FIG. 5 is a longitudinal vertical sectional view on line 5—5 of FIG. 1.

The floor 12, not all of which is shown in detail, typically comprises four respective panels 48, each connected to a front, rear or end wall along a respective lower marginal edge 50, these being joined and folded in two adjoining pairs which have centrally disposed edges which interengage to guide and lock the floor into a flat horizontal condition as the box is erected to its condition of use, shown in FIGS. 1, and 4-6, from its flattened, shipping condition, shown in FIGS. 2 and 3. (When the box is in its folded condition, the floor panels fold upwards along the lines 50 and each pair of adjacent joined floor panels folds along a diagonal line lying between the planes of what is shown in FIGS. 2 and 3. Again, this structure is not depicted in detail herein because it is exemplary, and was not newly developed for the box of the present invention.)

Figure 6:
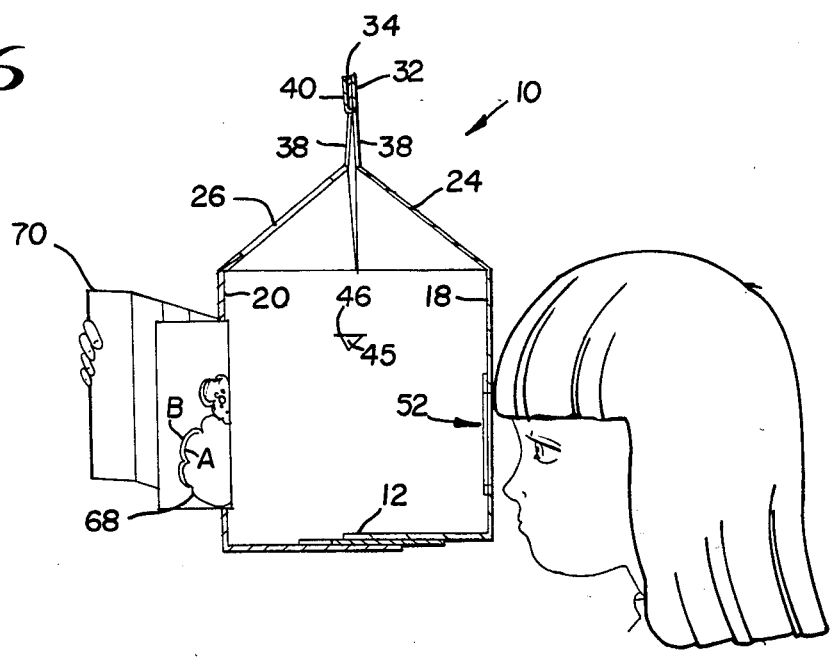
FIG. 6 is a transverse vertical sectional view thereof on line 6—6, showing the viewer in use.

Paying closer attention now to the features which provide the built-in 3-D viewer and theater functions, one sidewall of the box 10, e.g. the front wall is shown provided with viewing aperture means 52. In the preferred embodiment, the viewing aperture means is constituted by two distinct apertures 54, 56 each of which is approximately the size of a spectacles lens, and the space 58 between them approximating that between spectacles lenses in a pair of eyeglasses. None of these details is deemed crucial, except that when a user, whether a child or an adult holds the package front up to his or her eyes as shown in FIG. 6, both eyes should simultaneously be able to see into the box through the aperture means, straight towards the interior 60 of the opposite wall 20 of the box.

The aperture means 52 further includes two lenses 62, 64 of translucent or transparent material, typically "window panes" of synthetic plastic film F.D.A. approved for use in food packaging. The lenses 62, 64 are substantially different from one another in some visually apparent optical quality affecting light transmission, typically color. For instance one lense may be of a "hot" color, such as red, orange or yellow and the other of a "cool" color, such as blue, blue-green, or green.

The aperture means 52 could be constituted by a single laterally elongated opening in which both lenses are fitted in a contiguous relationship. However, in such a case, the persons nasally exhaled breath is likely to befog the lens restricting the user's view into the package interior. Accordingly, provision of the opaque bridge space 58 is preferred; indeed, it is preferred that the space be flared in width towards the bottom, with the apertures being correspondingly curtailed in width as shown, in order to minimize fogging of the window panes 62, 64.

As to the provision of a stereoptic scene with the package 10 for 3-D viewing through the window panes 62, 64 by the user, the present invention includes two related, preferred embodiments. In one, as depicted in FIG. 1, a single scene or a plurality or succession of scenes is printed directly on the interior 60 of the back wall, whether directly on the same sheet of material as that which constitutes the rear wall 20 or on a sheet of material which is applied thereto, juxtaposed therewith or superimposed thereupon. In the related preferred embodiment, instead of or in addition to providing the scene or plurality or succession of scenes in a static manner on the interior 60 of the rear wall 20, the scene is or scenes 68 are provided on one or both faces of an elongated strip 70 of sheet material, which may be accordian pleated or the like to permit it to be provided to the consumer as a package insert (e.g. as illustrated in FIG. 4). In the event the scene graphics are provided on a separate strip, the rear wall 20 preferably is provided with two widely spaced, parallel slots 72, so that the strip 70 may be inserted through one slot and threaded out through the other. Accordingly, at any one time a complete frame or panel of the scene graphics may be positioned within the package interior against the rear wall for viewing through the windows 62, 64. See FIGS. 5 and 6. Although in the instance depicted, the slots 72 are vertically elongated, laterally narrow and laterally widely spaced, they could be horizontally elongated, vertically narrow and vertically widely spaced, provided the scenes were correspondingly oriented on the strip 70.

In any event each scene 66 is printed (using inks approved by the F.D.A. for use in food packaging), in two generally superimposed views A, B which are laterally offset from registry with one another by an amount which is somewhat dependent on the front-to-rear dimension of the box, i.e. the distance between the bicolored 3-D viewer 62/64 and the "screen" 60, as is well understood in the bicolor 3-D viewer art. Essentially, the two views of each scene are printed using colors and/or techniques which cause most or all of one view of the scene to be entirely or predominantly visible only thorugh one of the windows 62, 64, and most or all of the other view of the same scene to be entirely or predominantly visible only through the other of the windows. As the viewing person's eyes become focussed and accommodated, the two views of the same scene are merged in the person's brain and interpreted as if being naturally different aspects of the same scene. Accordingly, if the two views differ in aspect by approximately the same angle as the angular distance between the viewing person's two eyes, assuming the person is focussing on a scene which is as far away from the viewer as it appears to be, then the three-dimensional effect is heightened.

By preference, the scenes are printed on generally opaque stock such as paper or paperboard, and are not subject to being backlighted. Accordingly, especially where the scene is complex and includes background and foreground material of relatively low contrast, if the only light available for illuminating the scene were that entering through the window panes 62, 64, the scene may be too dim to be fully appreciated, especially where the viewing person presses the package front especially close to his or her face. The inventor has two proposals for heightening the illumination in such circumstances. One is that the lid of the box may simply be opened to its FIG. 4 condition. However, that may depreciate the "theater" illusion preferably provided for the device by graphics 74 applied on the outside and/or insode surfaces of the box. Accordingly, the preferred solution is that one or the other or both of the roof panels 24, 26 be provided with skylight-simulating apertures 76. Each skylight aperture may initially be closed by an integral shutter which is bounded either around its entire periphery with a line of perforations so that the user may physically remove it to open the aperture. Or the periphery along one side may be marked or scored for bending, so that when the aperture is opened the shutter remains attached as a flat. In either instance, the aperture may be simply an opening, or it may be "glazed" with a "window" of transparent plastic sheet material. Instead, a similar window may be provided without a shutter, if desired.

It should now be apparent that the openable package for a consumer product such as child's meal, with a built-in 3-D viewer feature simulating a theater as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. An openable package for a consumer product, with a built-in 3-D viewer, comprising:
    folding, erectable wall means defining a package including a bottom wall, a top wall, and two pairs of generally upright opposed sidewalls, said package enclosing an interior space;
    said top wall including two roof panels which, when said package is in a closed condition, rise obliquely from respective upper marginal edges of said sidewalls of one of said pairs of generally upright opposed sidewalls to a center ridge;
    upstanding, slotted handle means provided on each said roof panel at said center ridge;
    closure means releasably interconnecting said handle means so as to openably, reclosably maintain said package in said closed condition and provide access to said interior space;
    said wall means including gable means which, when said package is in said closed condition, extend from respective upper marginal edges of said sidewalls of the other of said pairs of generally upright opposed sidewalls to bridge between such upper marginal edges and said roof panels and thus contributing to enclosing said interior space;
    viewing aperture means provided in one of said sidewalls, said viewing aperture means including a region through which a user's left eye may look into the interior space and a laterally adjacent region through which the user's right eye simultaneously may look into the interior space;
    the left eye region being glazed with a light-transmitting sheet material having a first visually apparent optical characteristic and the right eye being glazed with a light-transmitting sheet material having a second visually apparent optical characteristic which is substantially different from said first visual apparent optical characteristic;
    the respective sidewall opposed to said one sidewall having an interior side providing a viewing screen; and
    means providing a set of 3-D graphics including at least one scene presented in two substantially superimposed views which are slightly out of registry, along a lateral axis, with the left-most said view being printed in a medium constructed and arranged to be predominantly viewed only through the left eye region and the right-most said view being printed in a medium constructed and arranged to be predominantly viewed only through the right eye region;
    said graphics providing means being constructed and arranged to be superimposed upon said screen for 3-D viewing through said viewing aperture means;
    at least some of said graphics providing means being constituted by printing upon an opaque strip; said respective opposite sidewall of said package which interiorly provides said screen having means defining a pair of parallel slits therethrough which are laterally spaced relative to one another; said strip being insertable through one of said slits and out through the other of said slits in order to superimpose said graphics providing means on said screen;
    aperture means defining a skylight in said one of said roof panels top wall for front-illuminating said graphics providing means within said interior space said aperture means being laterally bounded at the left and right by material of said one roof panel;
    said wall means including a portion of said one roof panel of said top wall for at least temporarily closing said aperture so that said interior space may be substantially enclosed by said wall means for packaging at least one consumer article, which, upon removal exposes said viewing screen to said viewing aperture means;
    said roof panel portion being constructed and arranged to be at least temporarily removed while said closure means remains releasably interconnected so that said set of 3-D graphics may be observed in a front-illuminating condition through said viewing aperture while said roof panel portion is at least temporarily removed but said closure means continues to maintain said roof panels otherwise closed.

2. The openable package of claim 1, further comprising:
    a meal for a person, said meal being removably contained in said package so as to fill a substantial part of said interior space, so much so that said meal, until removed from said package by opening said one wall, obstructs said screen relative to said viewing aperture means.

3. The openable package of claim 1, wherein:
    one of said left eye region and right eye region is glazed with a hot-colored translucent material and the other of said left eye region and said right eye region is glazed with a cool-colored translucent material.

4. The openable package of claim 3, wherein:
    said left eye region is constituted by an aperture which is non-contiguous with said right eye region, which is constituted by a respective, separate aperture, there being opaque material of said one sidewall provided between these left and right apertures as a bridge; said bridge being constructed and arranged to reduce nasally expelled breath of the viewing user from befogging said glazing.

5. The openable package of claim 1, wherein:
    at least some of said graphics-providing means are constructed and arranged to be superimposed upon said screen by being printed on said screen.

6. The openable package of claim 1, wherein:
    said graphics providing means comprises cartoon characters.

7. The openable package of claim 1, further including:
    graphics printed exteriorly on said wall means in simulation of the appearance of the exterior of a movie theater.

8. The openable package of claim 1, further including:
    graphics printed interiorly on said wall means in simulation of the appearance of the interior of a movie theater.

* * * * *